(12) United States Patent
Rood

(10) Patent No.: US 6,273,572 B1
(45) Date of Patent: Aug. 14, 2001

(54) BICYCLE REFLECTOR AND MOUNTING BRACKET

(75) Inventor: Michael J. Rood, Elgin, IL (US)

(73) Assignee: Sate-Lite Manufacturing Company, Niles, IL (US)

( * ) Notice: Subject to any disclaimer, the term of this patent is extended or adjusted under 35 U.S.C. 154(b) by 0 days.

(21) Appl. No.: 09/386,796

(22) Filed: Aug. 31, 1999

(51) Int. Cl.[7] ..................................................... G02B 5/12
(52) U.S. Cl. .......................... 359/549; 359/550; 359/842
(58) Field of Search .................................... 359/549, 550, 359/521, 842, 871

(56) References Cited

U.S. PATENT DOCUMENTS

| D. 243,590 | 3/1977 | Amoroso . | |
|---|---|---|---|
| D. 244,515 | 5/1977 | Tuleja . | |
| D. 282,726 | 2/1986 | Dietz et al. . | |
| D. 312,589 | 12/1990 | Kagayama . | |
| D. 312,590 | 12/1990 | Kagayama . | |
| D. 314,353 | 2/1991 | Betti . | |
| D. 327,659 | 7/1992 | Ueda . | |
| D. 328,441 | 8/1992 | Tsuyama . | |
| D. 344,246 | 2/1994 | Craver et al. . | |
| D. 368,044 | 3/1996 | Hoying et al. . | |
| D. 369,568 | 5/1996 | Sloot . | |
| 3,961,811 | 6/1976 | Brilando et al. . | |
| 3,990,664 | 11/1976 | Horvath et al. . | |
| 4,005,874 | 2/1977 | Ohtani . | |
| 4,006,877 | 2/1977 | Van Niel . | |
| 4,093,263 | 6/1978 | Rihm . | |
| 4,483,586 | * 11/1984 | Sisto . | |
| 4,715,681 | 12/1987 | Johnson . | |
| 5,175,528 | * 12/1992 | Choi et al. | 340/331 |
| 5,563,742 | * 10/1996 | Menz | 359/842 |

* cited by examiner

Primary Examiner—Cassandra Spyrou
Assistant Examiner—Euncha Cherry
(74) Attorney, Agent, or Firm—Shughart Thomson & Kilr P.C

(57) ABSTRACT

Two separate but similar designs for bicycle reflectors are included, one designed for forward facing and which mounts to the handlebar of virtually any bicycle and one which mounts on the seat post and faces rearward, again mounting easily on virtually any bicycle design. Both reflectors use similar integrally molded mounting systems in which a mounting collar is provided which surrounds the seat; post or handlebar and which is tightened into place via a single set screw. A support arm extends outward tangentially from the collar and mounts a mounting bracket receptacle which snap fits and securely holds a reflector which is angled such that, when the collar is positioned on the tubular member, the mounting bracket receptacle is placed in a vertical orientation. By attaching the collar to the seat post or handlebar such that the mounting bracket is rear facing, or forward facing, respectively, and snapping the reflector into position on the mounting bracket receptacle, the installer is guaranteed that the reflector will be positioned in a vertical orientation which meets the CPSC standards without any further adjustment.

6 Claims, 2 Drawing Sheets

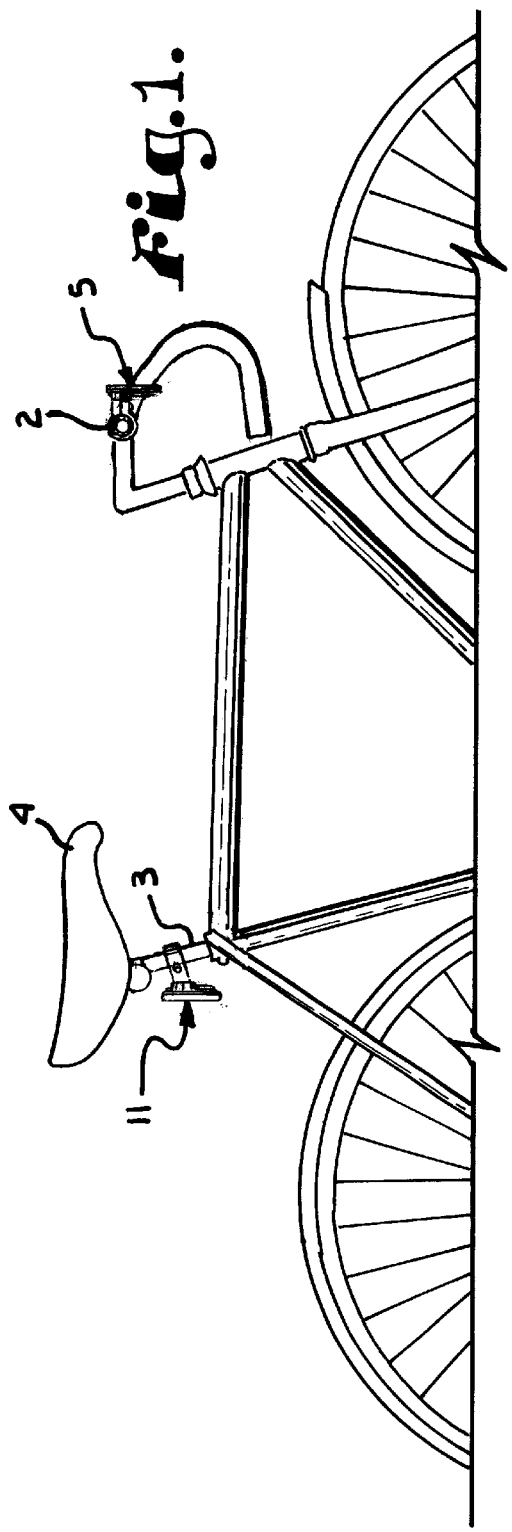
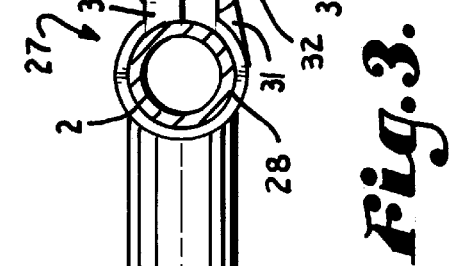
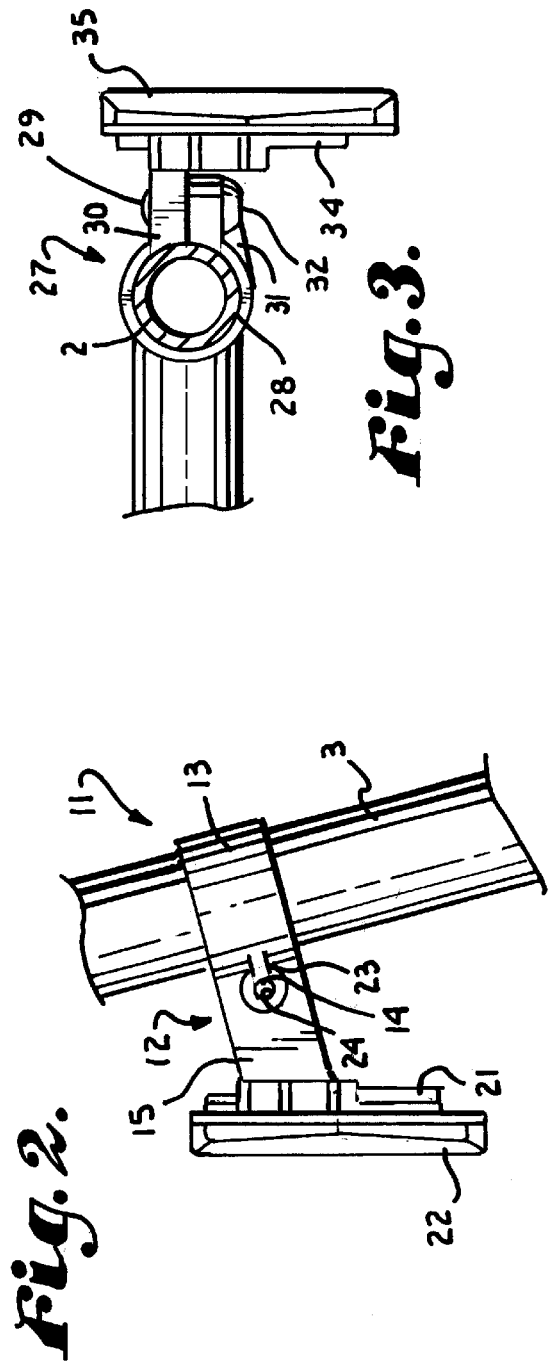

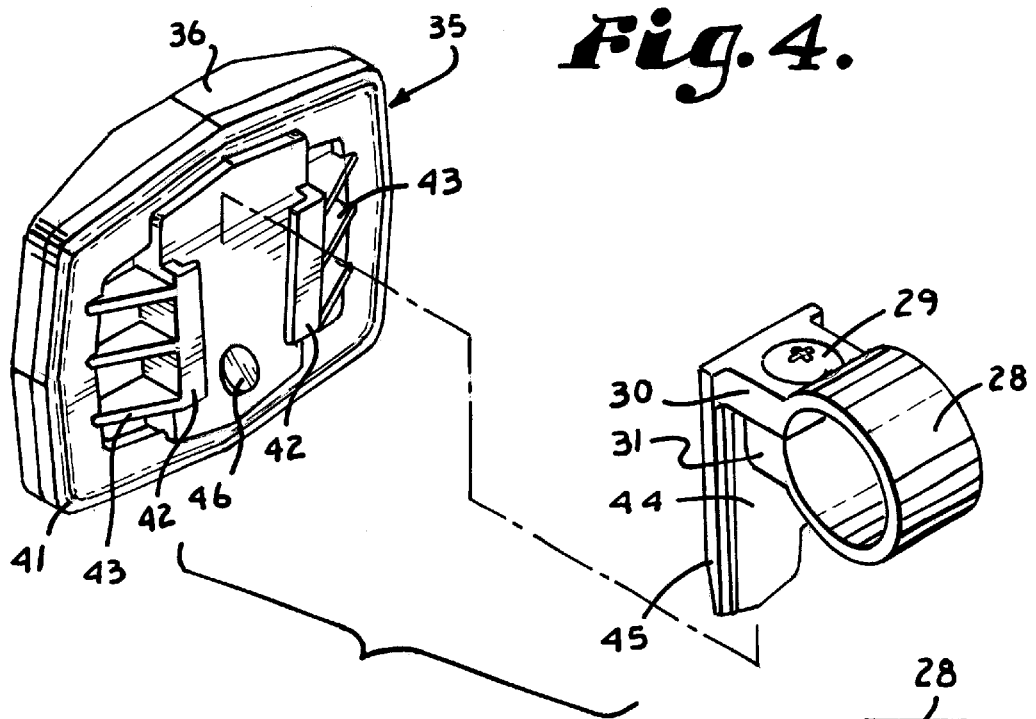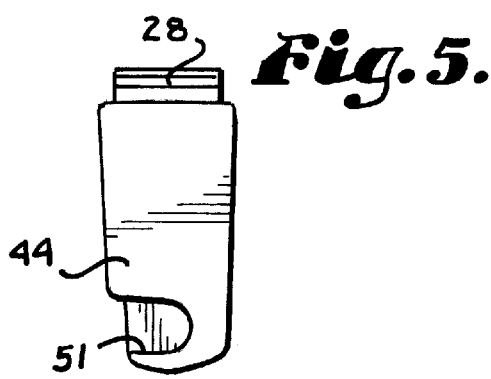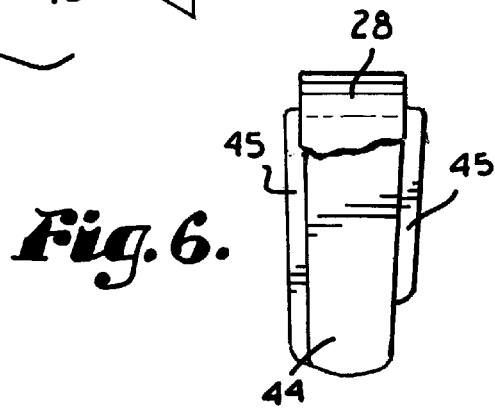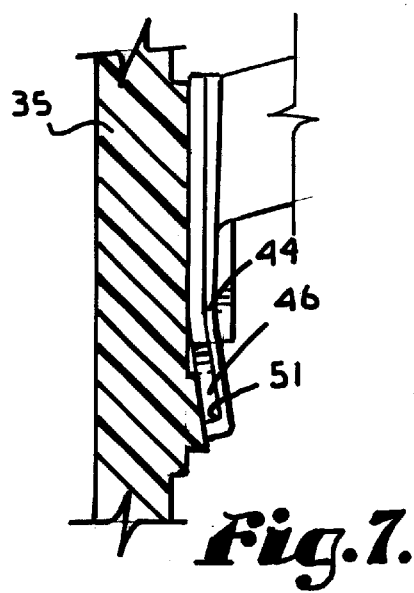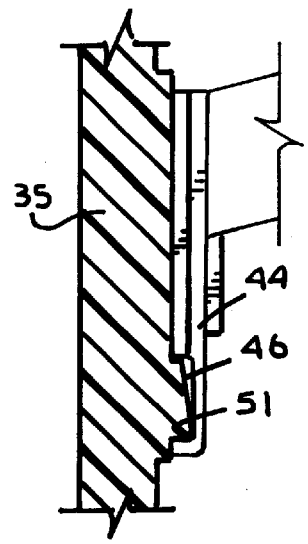

BICYCLE REFLECTOR AND MOUNTING BRACKET

BACKGROUND OF THE INVENTION

1. Field of the Invention

The present invention is directed to an improved bicycle reflector and mounting bracket, and, more particularly, to such an improved bicycle reflector and mounting bracket which is convenient and easy to install, which is compact and which snaps together easily, which installs via a single set screw and which, when installed properly on a bicycle, automatically assumes the proper orientation to meet the CPSC standards for bicycle reflectors.

2. Description of the Related Art

A number of different designs have been devised for bicycle reflectors. Examples are found in U.S. Pat. No. 3,990,664 to Stephen Horvath, and entitled MOUNTING BRACKET FOR REFLECTORS; U.S. Pat. No. 4,005,874 to Tadakatsu Ohtani, entitled MEANS FOR SUPPORTING A REFLECTOR ATTACHING BRACKET FOR A BICYCLE; and U.S. Pat. No. 4,715,681 to William Johnson, entitled BICYCLE REFLECTOR FOR HANDLEBAR ATTACHMENT. Each of these designs is somewhat complex in construction and requires multiple adjustments for proper orientation. The Consumer Product Safety Commission (CPSC) has provided requirements for bicycle manufacturers to supply forward and rear facing reflectors on their bicycles. Furthermore, the CPSC requires that such reflectors, when installed, be oriented within 5 degrees of vertical when the bicycle is upright and moving. With relatively complex designs such as the three patents mentioned earlier, adjustment to meet these CPSC standards can be time consuming and complex. It is clear, then, that a need exists for an improved bicycle reflector. Such an improved reflector should be quick and easy to install on a variety of bicycle designs, and should require virtually no adjustment to be oriented to the CPSC standards for bicycle reflectors.

SUMMARY OF THE INVENTION

The present invention involves two separate but similar designs for bicycle reflectors, one designed for forward facing and which mounts to the handlebar of virtually any bicycle and one which mounts on the seat post and faces rearward, again mounting easily on virtually any bicycle design. Both reflectors use similar integrally molded mounting systems. In the case of the seat post mounting system, a mounting collar is provided which surrounds the seat post and which is tightened into place via a single set screw. A support arm extends outward tangentially from the seat post collar and mounts a vertical mounting bracket receptacle which snap fits and securely holds a rear facing reflector which is angled outward such that, when the collar is positioned on the seat post, the mounting bracket receptacle is placed in a vertical orientation. By attaching the collar to the seat post such that the mounting bracket receptacle is rear facing, and snapping the reflector into position on the mounting bracket receptacle, the installer is guaranteed that the reflector will be positioned in a vertical orientation which meets the CPSC standards without any further adjustment. The handlebar reflector mounting system is very similar and also includes a mounting collar which surrounds the handlebar and which is tightened into place via a single set screw. A considerably shorter support arm extends outward tangentially from the seat post collar and mounts a mounting bracket receptacle at a ninety degree angle which snap fits and securely holds a forward facing reflector in a vertical position. Again, by attaching the collar to the handlebar via the single set screw such that the mounting bracket receptacle is forward facing, and snapping the reflector into position on the mounting bracket receptacle, the installer is guaranteed that the reflector will be positioned in a vertical orientation which meets the CPSC standards without any further adjustment.

OBJECTS AND ADVANTAGES OF THIS INVENTION

The principal objects and advantages of the present invention include: providing an improved bicycle reflector and mounting bracket; providing such a reflector and bracket which is compact and easy to install; providing such a reflector and bracket which installs with a single set screw; providing such a reflector and bracket which automatically places the reflector at the proper angle to meet CPSC standards; providing a slightly different mounting bracket design for front and rear facing reflectors, but providing each with the same objects and advantages; providing such a reflector and bracket which conveniently mounts on any bicycle seat post (for rear reflectors) or any bicycle handlebar (for front reflectors); and providing such a reflector and mounting bracket which is simple, efficient and economical to manufacture, and which is particularly well-adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary, side elevational view of a bicycle equipped with both forward and rear facing reflectors and mounting brackets in accordance with the present invention.

FIG. 2 is a greatly enlarged, side elevational view of the portion of FIG. 1 showing details of the rear facing, seat post mounted reflector and mounting bracket.

FIG. 3 is a greatly enlarged, side elevational view of the portion of FIG. 1 showing details of the front facing, handlebar mounted reflector and mounting bracket.

FIG. 4 is an exploded, perspective view of the front facing, handlebar mounted reflector and mounting bracket.

FIG. 5 is a rear elevational view of the mounting bracket of FIG. 4, showing the receiving slot for snap fitting the reflector into position.

FIG. 6 is a side elevational view of the mounting bracket of FIG. 4, with portions of the collar and the set screw receiver removed to show the details of the tongue.

FIG. 7 and FIG. 8 are cross sectional views of the reflector and mounting bracket of FIG. 4, taken along line 7—7 of FIG. 4, and illustrating, in FIG. 7, the reflector being inserted into the mounting bracket receptacle, and, in FIG. 8, the reflector fully snapped into position within the mounting bracket receptacle.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring now to the drawings, and more particularly to FIGS. 1–3, a representative bicycle is illustrated and generally indicated at 1. The bicycle 1 includes a handlebar 2, a seat post 3 upon which a bicycle seat 4 is mounted. Details such as brakes and gear shifts have been deleted for purposes of clarity of illustrating the present invention.

The bicycle 1 is equipped with a front facing, handlebar mounted reflector and mounting bracket in accordance with the present invention, and generally indicated at 5, as well as a rear facing, seat post mounted reflector and mounting bracket, generally indicated at 11.

Referring to FIG. 2, the rear facing seat post reflector and mounting bracket 11 is illustrated in greater detail. The rear facing mounting bracket is generally indicated at 12, and includes a mounting collar 13 which surrounds the seat post 3 and which is tightened into place via a single set screw 14. A support arm 15 extends outward tangentially from the seat post mounting collar 13 and mounts a mounting bracket receptacle 21 which snap fits and securely holds a rear facing reflector 22. A set screw receiver arm 23 is also attached to and extends outward tangentially from the collar 13, is positioned opposite the support arm 15 and includes a threaded set screw receiving bore 24 sized to receive the threaded end of the set screw 14 which is also inserted through a through bore (not shown) in the support arm 15. The mounting bracket receptacle 21 is angled outward due to the length and angle of the support arm 15 such that, when the collar 13 is positioned on the seat post 3, and the set screw 14 is tightened into the set screw receiver arm 23, the mounting bracket receptacle 21 is automatically placed in a vertical orientation. More specifically, the mounting bracket receptacle 21 extends downward relative to the support arm 15 at a first obtuse angle relative to the collar 13. The first obtuse angle is fixed and selected to approximately equal a second obtuse angle formed between the ground and the seat post of the bicycle to which the reflector mounting bracket 11 is secured when the bicycle is in an upright position on the ground. Thus, by attaching the collar 13 to the seat post 3 such that the mounting bracket receptacle 21 is rear facing, and snapping the reflector 22 into position on the mounting bracket receptacle 21, the installer is guaranteed that the reflector 22 will be positioned in a vertical orientation which meets the CPSC standards without any further adjustment. The mounting bracket 12, including collar 13, support arm 15, mounting bracket receptacle 21, and set screw receiver arm 23 are preferably made of molded plastic as a single integrated part.

The handlebar reflector mounting bracket and reflector 5 is best illustrated in FIG. 3, and is very similar to that of the seat post reflector and mounting bracket 11. The handlebar mounting bracket, generally indicated at 27, also includes a mounting collar 28 which surrounds the handlebar 2 and which is tightened into place via a single set screw 29. A considerably shorter support arm 30 extends outward tangentially from the handlebar mounting collar 28. A set screw receiver arm 31 is also attached to and extends outward tangentially from the collar 28, is positioned opposite the support arm 30 and includes a threaded set screw receiving bore 32 sized to receive the threaded end of the set screw 29 which is also inserted through a through bore (not shown) in the support arm 30. The support arm 30 mounts a mounting bracket receptacle 34 at a ninety degree angle thereto which receptacle 34 snap fits and securely holds a forward facing reflector 35 in a vertical position. Again, by attaching the collar 28 to the handlebar 2 via the single set screw 29 such that the mounting bracket receptacle 34 is forward facing, and snapping the reflector 35 into position on the mounting bracket receptacle 34, the installer is guaranteed that the reflector 35 will be positioned in a vertical orientation which meets the CPSC standards without any further adjustment. Again, the mounting bracket 27 including the collar 28, support arm 30, set screw receiver arm 31, and mounting bracket receptacle 34 are preferably made of molded plastic as a single integrated part.

Referring to FIGS. 4–8, details of the handlebar mounting reflector and mounting bracket 5 are further illustrated. It should be understood that the seat post reflector and mounting system 11 is similar in most respects and need not be illustrated in detail.

Referring to FIG. 4, the reflector 35 includes a forward facing, multi-faceted reflection surface 36 attached to a rear support member 41. The support member 41 includes a pair of L shaped receivers 42 arrayed on opposite sides thereof, with each receiver 42 being reinforced by ribs 43. The receivers 42 are spaced apart sufficiently to allow a tongue portion 44 of the mounting receptacle 34 to be inserted therein, and are tapered inward from top to bottom to provide a wedging action on the tongue portion 44, which is provided with opposing ledges 45 which are sized to fit within the respective receivers 42 on the reflector 35. The reflector 35 also includes a protruding button-like projection 46 positioned between and slightly below the receivers 42. This projection 46 is sized to be received in a slot 51 (FIG. 5) in the mounting receptacle tongue portion 44 as the tongue portion 44 is pushed into the space between the receivers 42. This action is best illustrated in FIGS. 7 and 8. It should be noted that, in FIG. 7, the tongue portion 44 has been inserted to a position in which the slot 51 is being forced outward and over the projection 46. Finally, at FIG. 8, the projection 46 snaps into place within the slot 51 and the reflector 35 is thus locked securely into position in a forward facing position, as shown in FIGS. 1 and 3. Again, it should be noted that the snap action fitting of the seat post reflector 22 to the seat post mounting bracket receptacle 21 is virtually identical in form and function.

Variations of the present invention will occur to those skilled in the art. For example, the reflectors 22 and 35 can be any legal shape and do not necessarily need to be multi-faceted. The slot 51 can be replaced with a circular depression, although the slot design is optimal for molding purposes. The positions of the slot 51 and the projection 46 can be reversed. Other variations could be made without departing from the spirit of the invention. It is thus to be understood that while certain forms of the present invention have been illustrated and described herein, it is not to be limited to the specific forms or arrangement of parts described and shown.

I claim:

1. A reflector and mounting system adapted for mounting on a seat post of a bicycle using a single screw, comprising:
   a) an integrally formed reflector mounting bracket including:
      i) a collar sized to surround the seat post of the bicycle;
      ii) a support arm with a first end attached to and extending outward from said collar, said support arm including a first through bore sized to receive the screw;

iii) a reflector mounting tongue attached to a second end of said support arm and extending downward relative thereto at a first obtuse angle relative to said collar; said first obtuse angle being fixed and selected to approximately equal a second obtuse angle formed between the ground and the seat post of the bicycle to which the reflector mounting bracket is secured when the bicycle is in an upright position on the ground; said reflector mounting tongue further including a receiving slot; and iv) a clamping arm also attached to and extending outward from said collar and being positioned opposite said support arm, said clamping arm including a second through bore for receiving the screw such that said screw is adapted to draw said clamping arm toward said support arm for clamping said collar around the bicycle seat post; and b) a reflector adapted to be fixedly mounted on said reflector mounting tongue in the same angular orientation as said tongue; said reflector includes a pair of opposing receivers spaced apart to receive said tongue such that said tongue fits between said receivers to hold said reflector in place thereon; and said reflector includes a projection positioned between and slightly below said receivers, wherein said slot is sized to receive said projection as said tongue is completely inserted between said receivers to lock said reflector in position thereon.

2. The reflector and mounting system as in claim 1 wherein:

a) said first obtuse angle at which said reflector mounting tongue extends relative to said collar is within five degrees of said second obtuse angle formed between the ground and the seat post of the bicycle to which the reflector mounting bracket is secured when the bicycle is in an upright position.

3. A reflector and mounting system adapted for mounting on a handlebar of a bicycle using a single screw, comprising:

a) an integrally formed reflector mounting bracket including:

i) a collar sized to surround the handlebar of the bicycle;

ii) a support arm with a first end attached to and extending outward from said collar, said support arm including a first through bore sized to receive the screw;

iii) a reflector mounting tongue attached to a second end of said support arm and extending downward relative thereto generally perpendicular to said support arm; said tongue includes a receiving slot; and iv) a clamping arm also attached to and extending outward from said collar and being positioned opposite said support arm, said clamping arm including a second through bore for receiving the screw such that said screw is adapted to draw said clamping arm toward said support arm for clamping said collar around the handlebar of the bicycle; and b) a reflector adapted to be fixedly mounted on said reflector mounting tongue; said reflector includes a pair of opposing receivers spaced apart to receive said tongue such that said tongue fits between said receivers to hold said reflector in place thereon; and said reflector includes a projection positioned between and slightly below said receivers, wherein said slot is sized to receive said projection as said tongue is completely inserted between said receivers to lock said reflector in position thereon.

4. A reflector mounting assembly adapted for mounting on a seat post of a bicycle, comprising:

a) an integrally formed reflector mounting bracket including:

i) a post clamp having a collar sized to surround the seat post of the bicycle and having a screw adapted for selectively tightening and loosening said post clamp about the seat post;

ii) a support arm with a first end attached to and extending outward from said collar; and iii) a reflector mounting tongue attached to a second end of said support arm and extending downward relative thereto at a first obtuse angle relative to said collar; said first obtuse angle being fixed and selected to approximately equal a second obtuse angle formed between the ground and the seat post of the bicycle to which the reflector mounting bracket is secured when the bicycle is in an upright position on the ground; said reflector mounting tongue includes a receiving slot; and b) a reflector adapted to be fixedly mounted on said reflector mounting tongue in the same angular orientation as said tongue; said reflector includes a pair of opposing receivers spaced apart to receive said tongue such that said tongue fits between said receivers to hold said reflector in place thereon; said reflector includes a projection positioned between and slightly below said receivers, wherein said slot is sized to receive said projection as said tongue is completely inserted between said receivers to lock said reflector in position thereon.

5. The reflector and mounting system as in claim 4 wherein:

a) said first obtuse angle at which said reflector mounting tongue extends relative to said collar is within five degrees of said second obtuse angle formed between the ground and the seat post of the bicycle to which the reflector mounting bracket is secured when the bicycle is in an upright position.

6. A reflector mounting assembly adapted for mounting on a handlebar of a bicycle, comprising:

a) an integrally formed reflector mounting bracket including:

i) a post clamp having a collar sized to surround the handlebar of the bicycle and having a screw adapted for selectively tightening and loosening said post clamp about the handlebar;

ii) a support arm with a first end attached to and extending outward from said collar; and iii) a reflector mounting tongue attached to a second end of said support arm and extending downward relative thereto generally perpendicular to said support arm; said tongue includes a receiving slot; and b) a reflector adapted to be fixedly mounted on said reflector mounting tongue; said reflector includes a pair of opposing receivers spaced apart to receive said tongue such that said tongue fits between said receivers to hold said reflector in place thereon; said reflector includes a projection positioned between and slightly below said receivers, wherein said slot is sized to receive said projection as said tongue is completely inserted between said receivers to lock said reflector in position thereon.

* * * * *